United States Patent [19]

Stone et al.

[11] 4,303,212

[45] Dec. 1, 1981

[54] VERTICAL SEEKING AIRCREW ESCAPE SYSTEM

[75] Inventors: W. James Stone; Ronald G. Stoutmeyer, both of Ridgecrest, Calif.

[73] Assignee: The United States of America as represented by the Secretary of the Navy, Washington, D.C.

[21] Appl. No.: 33,590

[22] Filed: Apr. 26, 1979

[51] Int. Cl.³ ............................................. B64D 25/10
[52] U.S. Cl. ......................... 244/122 AD; 244/122 A
[58] Field of Search ................. 244/122 AD, 122 AB, 244/122 A, 141, 3.21, 3.22, 3.23, 78, 79, 177, 195; 364/434

[56] References Cited

U.S. PATENT DOCUMENTS

| | | | |
|---|---|---|---|
| 3,216,676 | 11/1965 | Brown et al. | 244/195 |
| 3,362,662 | 1/1968 | McIntyre et al. | 244/122 AD |
| 3,592,419 | 7/1971 | Hantzsch | 244/122 AD |
| 3,624,367 | 11/1971 | Hamilton et al. | 244/3.21 X |
| 3,870,940 | 3/1975 | Espen | 244/177 X |
| 3,979,089 | 9/1976 | Miller et al. | 244/122 AD |

Primary Examiner—J. D. Miller
Assistant Examiner—Reinhard J. Eisenzopf
Attorney, Agent, or Firm—W. Thom Skeer; R. S. Sciascia; Kenneth G. Pritchard

[57] ABSTRACT

An aircraft ejection seat which seeks the upward vertical direction to enable safe ejection from inverted aircraft at low altitude. An attitude control processor processes signals from three-axis attitude sensors and controls servo valves which regulate the flow of hydraulic fluid to hydraulic actuators connected to a spherical rocket motor mounted on a two axis gimbal system.

1 Claim, 3 Drawing Figures

VERTICAL SEEKING AIRCREW ESCAPE SYSTEM

BACKGROUND OF THE INVENTION

1. Field of the Invention

The present invention relates generally to aircraft ejection seats. More particularly, the present invention relates to an aircraft ejection seat which seeks the upward vertical direction to enable safe ejection from inverted aircraft at low altitude.

2. Description of the Prior Art

Prior art ejection seats are pitch stabilized but do not have steering or guidance capability. Inverted low level ejections often result in pilot fatality when the seat is rocketed into the ground.

SUMMARY OF THE INVENTION

The present invention comprises an aircraft ejection seat which seeks the upward vertical direction to enable safe ejection from an inverted aircraft at low altitude. A spherical rocket motor is mounted in a two axis gimbal system attached to the bottom of the ejection seat. A hydraulic accumulator having a pressure source and containing hydraulic fluid is attached to hydraulic actuators which move the rocket motor gimbal rings about the pitch and roll axes. Flow of pressurized fluid to the actuators is controlled by a pair of hydraulic valves, which are controlled by a microprocessor. Feedback potentiometers mounted on each gimbal ring axis sense gimbal ring position and communicate the gimbal ring position to the microprocessor. Three-axis rate gyros attached to the seat communicate with the microprocessor to monitor seat pitch, roll, and yaw rates. The microprocessor also controls sequencing of events, such as pressurization of the accumulator, firing of the rocket motor, parachute deployment timing, and man-seat separation.

The computer is initialized by aircraft instruments prior to ejection. The computer fires the rocket and pressurizes the hydraulic fluid, and then steers the gimbal rings until the seat has rotated to a predefined orientation relative to the initialized orientation. Alternatively, the seat may have inertial or other guidance systems which are self-contained and which do not require initialization or update from aircraft systems.

DESCRIPTION OF THE PREFERRED EMBODIMENT

Figure 1:
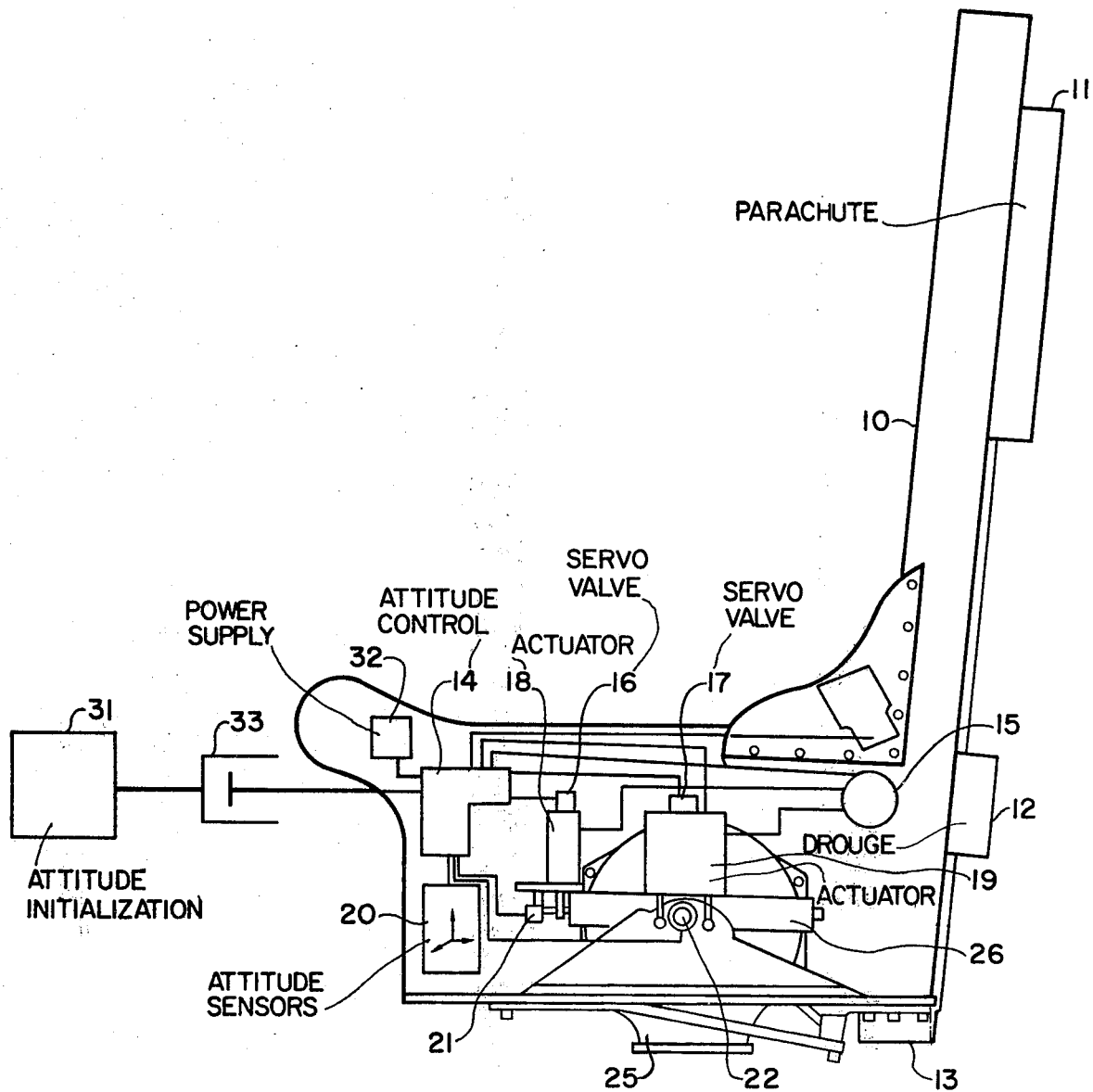
FIG. 1 shows an aircraft ejection seat with a spherical rocket motor and control devices attached thereto.

Referring to FIG. 1, there is shown an aircraft ejection seat frame 10. A personnel parachute 11 and a drouge parachute 12 are attached to the rear of ejection seat frame 10. A drouge gun 13 is attached to the bottom of ejection seat frame 10 and connected to drouge parachute 12. A hydraulic accumulator 15, which has a pressure source and which contains hydraulic fluid is mounted to ejection frame 10. A first electrically controlled hydraulic servo valve 16 and a second electrically controlled hydraulic servo valve 17 are connected to the output of hydraulic accumulator 15. A first hydraulic actuator 18, which may be a push-push single acting piston pair, is connected to the output of servo valve 16; and a second hydraulic actuator 19, identical to hydraulic actuator 18, is connected to the output of servo valve 17. A two axis gimbal system 26 having a first pitch axis gimbal and a second roll axis gimbal is mounted to ejection seat frame 10, and a rocket motor 25 is attached to the two axis gimbal system 26. A first position feedback circuit 21, which may be a potentiometer, is mounted on the pitch axis of two axis gimbal system 26, and a second similar, position feedback circuit 22 is mounted on the roll axis of two axis gimbal system 26.

A system of attitude sensors 20, which may be three-axis rate gyros, attached to ejection frame seat 10, monitor the pitch, roll, and yaw rates of ejection seat frame 10. An attitude control processor 14 is connected to attitude sensors 20. An attitude initialization circuit 31 in the aircraft is connected to the ejection seat control system by a break away connector 33.

Figure 2:
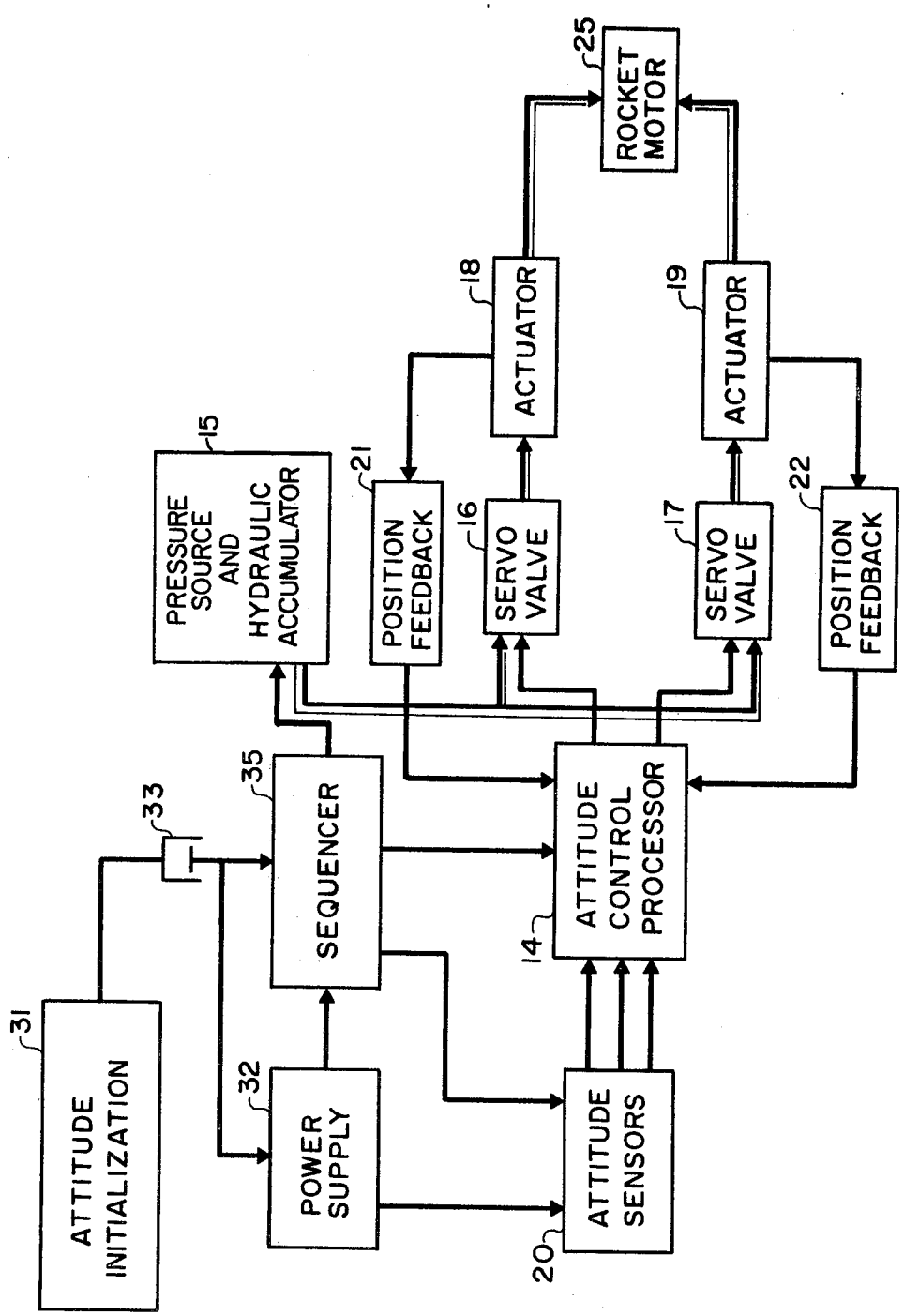
FIG. 2 is a block diagram of the attitude control system.

Operation of the ejection seat control system is explained in detail with reference to FIG. 2. In one embodiment of the invention, the ejection seat control system has initial conditions provided by attitude initialization circuit 31 prior to ejection from an aircraft. After ejection, power is supplied to the ejection seat control system by a power supply 32, which is connected to attitude sensors 20 and to a digital microprocessor 29 which contains a sequencer 35 and attitude control processor 14. Sequencer 35 has outputs connected to attitude sensors 20, to attitude control processor 14, and to hydraulic accumulator 15. Hydraulic accumulator 15 provides hydraulic pressure to servo valve 16 and to servo valve 17. Servo valve 16 regulates the amount of hydraulic fluid supplied to hydraulic actuator 18, which controls the pitch axis of two axis gimbal system 26 and servo valve 17 controls the amount of hydraulic fluid supplied to hydraulic actuator 19, which controls the roll axis of two axis gimbal system 26. Controlling the motion of two axis gimbal system 26 controls the direction of the thrust of rocket motor 25.

Figure 3:
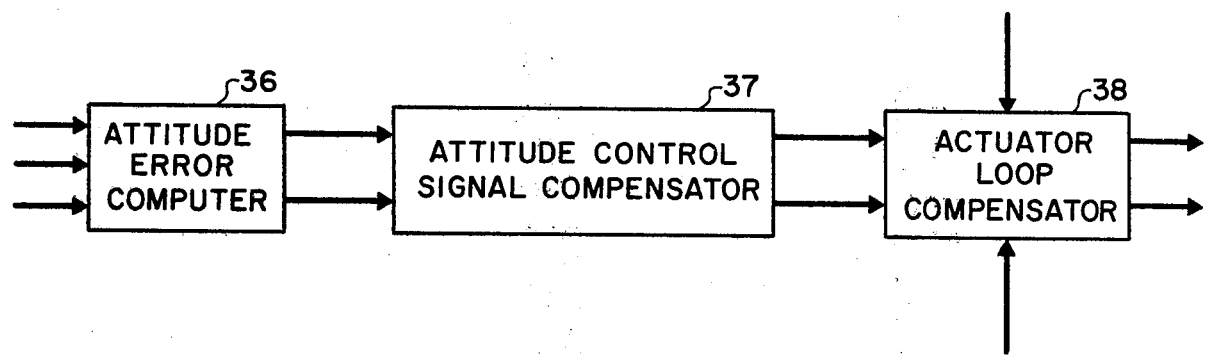
FIG. 3 is a block diagram of the attitude control processor.

A microprocessor which has functioned satisfactorily in developmental models of the invention is that digital microprocessor known as INTELS 8 bit MCS-8080 Microprocessor. Referring to FIG. 3, attitude control processor 14 includes an attitude error computer 36, which is connected to an attitude control signal compensator 37, which is connected to an actuator loop compensator 38. Attitude sensors 20 sense the pitch, roll, and yaw of ejection seat frame 10. Signals corresponding to pitch, roll, and yaw are input to attitude error computer 36, which supplies a pitch control signal and a roll control signal to attitude control signal compensator 37. A first position feedback circuit 21 is connected between pitch axis hydraulic actuator 18 and actuator loop compensator 38 and a second position feedback circuit 22 is connected between roll axis hydraulic actuator 19 and actuator loop compensator 38. Actuator loop compensator 38 compares the pitch control signal from attitude control signal compensator 37 to the feedback signal from position feedback circuit 21 and compares the roll command signal from attitude control signal compensator 37 to the feedback signal from position feedback circuit 22 and sends signals to servo valves 16 and 17 to cause the ejection seat to seek the upward vertical direction with minimal command error.

What is claimed is:

1. A vertical seeking aircraft ejection seat comprising:
a seat frame;
a two axis gimbal system having a pitch axis gimbal and a roll axis gimbal attached to said seat frame;
a spherical rocket motor for producing thrust mounted on said two axis gimbal system;
a three axis rate gyro system for sensing the attitude of said aircraft ejection seat connected to said seat frame;
a hydraulic accumulator including a predetermined quantity of hydraulic fluid attached to said seat frame;
a power supply attached to said seat frame;
a first and a second servo valve connected to said hudraulic accumulator for receiving said pressurized hydraulic fluid;
at least two hydraulic actuators connected respectively between said servo valves and the pitch and roll axes of said two axis gimbal system for controlling said motor means;
an attitude control processor comprising a digital microprocessor connected between said three axis rate gyro system and said hydraulic accumulator for receiving attitude inputs and directing said accumulator;
an attitude control signal compensator connected to said microprocessor;
an actuator loop compensator connected between said attitude control signal compensator and said first and second servo valves;
a first position feedback circuit connected between said pitch axis hydraulic actuator and said actuator loop compensator; and
a second position feedback circuit connected between said roll axis hydraulic actuator and said actuator loop compensator; and
an attitude initialization circuit for providing a set of initial conditions to said microprocessor upon seat ejection.

* * * * *